UNITED STATES PATENT OFFICE.

JOSEPH E. EDMUNDSON, OF ATHENS, OHIO; MARGARET EDMUNDSON ADMINISTRATRIX OF SAID EDMUNDSON, DECEASED.

DENTIFRICE.

SPECIFICATION forming part of Letters Patent No. 315,750, dated April 14, 1885.

Application filed April 23, 1884. (No specimens.)

*To all whom it may concern:*

Be it known that I, JOSEPH E. EDMUNDSON, a citizen of the United States, residing at Athens, in the county of Athens and State of Ohio, have invented certain new and useful Improvements in Dentifrices; and I do declare the following to be a full, clear, and exact description of the invention, such as will enable others skilled in the art to which it appertains to make and use the same.

My invention relates to dentifrices; and it consists of the ingredients named, in about the proportions specified. I use camphor-gum, pulverized, one hundred and seventy-eight pounds; carbonate of magnesia, pulverized, three and three-eighths pounds; bicarbonate of soda, pulverized, four and one-half pounds; prepared chalk, (English,) pulverized, sixty-three pounds; white castile-soap, pulverized, nine pounds; borate soda, pulverized, fifteen and three-fourths pounds; red cinchona, pulverized, three-eighths of a pound; orris-root, pulverized, four and one-half pounds; chlorate potash, pulverized, one and one-eighth pound; white sugar, (pure,) pulverized, thirty and one-half pounds; oil winter-green, (fresh,) one and one-half pound; carmine, pulverized, nine drams; spirits of hartshorn, nine ounces; alcohol, four and one-half ounces.

In preparing my compound, I place the camphor in a vessel with sufficient alcohol to form a paste, and add magnesia carbonate sufficient to work a powder. The carmine is placed in a vessel and rubbed up with spirits of hartshorn and bottled, sufficient spirits of hartshorn being added to make a pint; shake and pour onto the remaining magnesia, dry and mix with the compound of camphor-gum and magnesia.

The foregoing and the remaining ingredients are now put in a suitable mixer, preferably a rotary one, and thoroughly mixed, when the compound is completed and ready for use. The carbonate magnesia is antacid, less irritant than alkalies, polishes the teeth, and tends to prevent caking of the dentifrice. The gum-camphor is anodyne, stimulant, and, in combination with borax, assists disintegration and removal of tartar; powdered and applied to indolent and unhealthy ulcers, it produces contraction of the tissues and hastens the cure. It is also a disinfectant. Bicarbonate of soda is antacid and cooling, and in many cases gives prompt relief from toothache. Borate of soda is refrigerant, detergent, and efficacious as local application in aphthous affections of the mouth, and sweetens the compound. Cinchona red is highly astringent, and hardens and purifies the gums. Chlorate of potash is a more active agent than borax, and decreases liability to cake. It is not desirable to increase the bulk of borax. Oil of winter-green is aromatic, astringent, and stimulant; also used to flavor; carmine for tinting only. The spirits of hartshorn are used in preparing the carmine for coloring the compound. Alcohol is used in reducing the camphor to paste. It is a desideratum to prevent the powder from caking, which I accomplish by the described compound, which is the result of many years' professional study, experiment, and experience. The carmine, being used only as a coloring, and the hartshorn in preparing the same, could be dispensed with without changing the action of the powder. The alcohol is also used merely in the preparation of the compound, and not as an essential ingredient of the completed powder.

Having described my invention, what I claim, and desire to secure by Letters Patent, is—

The herein-described dentifrice, having as essential ingredients borate of soda, chlorate of potash, and spirits of hartshorn and alcohol, combined with gum-camphor, carbonate of magnesia, bicarbonate of soda, prepared chalk, white castile-soap, red cinchona, orris-root, sugar, oil of winter-green, and carmine, or equivalents, employed in the proportions and compounded substantially as specified.

In testimony whereof I affix my signature in presence of two witnesses.

JOSEPH E. EDMUNDSON.

Witnesses:
HENRY T. BROWN,
L. A. KROUS.